United States Patent [19]
Bienert et al.

[11] 3,711,594
[45] Jan. 16, 1973

[54] PROCESS FOR MAKING BORON NITRIDE BODIES

[75] Inventors: Klaus Bienert, Winfried Lang, Herbert Weidner, all of 8263 Burghausen, Germany

[73] Assignee: Walker-Chemitronic Gesellschaft fur Elektronik Grundstoffe m. b. H. Burghause-off., Germany

[22] Filed: Jan. 27, 1971

[21] Appl. No.: 110,245

[52] U.S. Cl. ................ 423/290, 106/39R, 106/55
[51] Int. Cl. .............................................. C01b 21/06
[58] Field of Search ........... 106/55, 39; 23/191, 358; 423/290

[56] References Cited

UNITED STATES PATENTS

| | | | |
|---|---|---|---|
| 2,824,787 | 2/1958 | May et al. | 23/191 |
| 3,495,955 | 2/1970 | Grulke | 23/191 |

*Primary Examiner*—James E. Poer
*Attorney*—Donald Malcolm

[57] ABSTRACT

Process for making highly pure detrition-resistant boron nitride pressed bodies from a boron-nitrogen-hydrogen compound having the general basic empirical formula $$BN_{3-x}H_{6-x},$$

where the value of $x$ is greater than 1 and smaller than 2, which comprises heating said compound to a temperature of 20° to 2,000° C under a pressure of 0.5–10 t/cm².

3 Claims, No Drawings

PROCESS FOR MAKING BORON NITRIDE BODIES

To produce boron nitride bodies, one generally uses boron nitride containing boron oxide. This causes the individual boron nitride granules to stick together. The boron oxide content can be attained, for instance, by adding several percentage points of boron oxide or by oxidation as required by the process.

On the other hand, this boron oxide content is troublesome in many situations, perticularly when great purity of the boron nitride body is required, e.g. when producing boron nitride crucibles which are used in the production of semiconductor bodies.

Moreover, the detrition strength of boron nitride bodies produced from boron nitride containing boron oxide, is frequently insufficient.

We have now discovered that when using boron-nitrogen-hydrogen compounds of the general basic empirical formula $$BN_{3-x} H_{6-3x}$$

where the value of $x$ is greater than 0 and smaller than 2, preferably greater than 1 and smaller than 2, for producing boron nitride bodies at a temperature of 20° to 2,000° C and a pressure of 0.5 – 10 t/cm², preferably 1 – 7 t/cm², one obtains highly detrition-resistant bodies.

It is surprising that in spite of the generating ammonia one obtains compact detrition-resistant bodies. Presumably separate boron nitride crystals that have already formed a connected by newly forming boron nitride into compact crystalline bodies with one another.

As boron-nitrogen-hydrogen compounds of the general formula $BN_{3-x} H_{6-3x}$ one understands compounds which derive from boron amide ($BN_3H_6$) by splitting off ammonia from one or several molecules of boron amide, so that the figure $x$ can assume all values larger than 0 and smaller than 2. Such compounds are created, for instance, during the reaction of boron halides and/or boric acid esters with ammonia, where, depending on the reaction conditions, one obtains products with greater and smaller $x$ values. Generally the $x$ values of the forming products tend toward 2 when the temperature rises, and higher molecular compounds are obtained there.

The boron-nitrogen-hydrogen compounds used in the process of the invention are splitting off amonia slowly even at room temperature, and faster when heated above 120° C, so that finally pure boron nitride is formed. Thus it is possible to make pressed bodies even at room temperature. However, the speed of the ammonia splitting increases as the temperature rises, so that it is useful to make the pressing between 700° and 1,200° C. In order to avoid any oxidation processes it is mostly necessary at these temperatures to rinse with inert gas, and besides rare gases, nitrogen and hydrogen can be used.

However during the pressing process which is carried out in the known manner, care must be taken that the forming ammonia can be piped off through appropriate apertures from the pressing equipment. In some cases the use of a vacuum can be useful for this.

Basically one can use all the boron-nitrogen-hydrogen compounds of the basic empirical formula $BN_{3-x} H_{6-3x}$. With low $x$ values, i.e. with large ammonia content of the starting compound, the pressing creates a large quantity of ammonia which is carried off. It is therefore more advantageous to start with compounds which contain less ammonia, particularly boron-nitrogen-hydrogen compounds whose $x$ value is between 1 and 2. Moreover it may be of advantage to subject the boron-nitrogen-hydrogen compounds to a tempering process before pressing, thus splitting off a large percentage of the ammonia. The actual pressing process is then carried out with a boron-nitrogen-hydrogen compound whose $x$ value is near 2. However, under no circumstances must all ammonia that can be split off be removed from the compound.

It is also advantageous to admix boron nitride powder with the boron-nitrogen-hydrogen compound and to perform the pressing after that. There presumably the born nitride crystals newly created from the boron-nitrogen-hydrogen compound connect the existing powder into compact bodies. An addition of up to 90 percent by weight of boron nitride still yields detrition-resistant sinter bodies, preferably 10 to 70 percent by weight are added. It has been found to be particularly advantageous to use voluminous, seemingly amorphous boron nitride powder. Such powders are created for instance during the tempering of boron-nitrogen-hydrogen compounds at higher temperatures (above 700° C).

The use of boron-nitrogen-hydrogen compounds for producing bodies of boron nitride pursuant to the invention yields products with a particular degree of purity and which excel with great detrition resistance. Such boron nitride bodies have many applications. Especially when one produces semiconductor bodies one frequently works with boron nitride bodies, like boats and small ships.

EXAMPLE 1

Two hundred g of raw boron-nitrogen-hydrogen compound produced from boric acid trimethyl ester and ammonia, with a content of 56.5 percent by weight of ammonia that can be split off were placed into a press, and at 800° C under a pressure of 6 t/sq.cm. pressed into a round form with a diameter of 40 mm. The detrition resistance of the formed pressed body was considerably better than that of the bodies made from boron oxide and boron nitride.

EXAMPLE 2

Twenty g of a boron-nitrogen-hydrogen compound produced from boric acid trimethyl ester and ammonia, after tempering for 2 hours in a vacuum at 200° C, with 3.4 percent by weight of ammonia that can be split off, are mixed with 180 g boron nitride powder, and, under the conditions described in Example 1, are pressed with additional nitrogen rinsing into a nitride boat. A highly pure (less than 10 ppm impurities) and detrition-resistant boron nitride body was created.

The invention claimed is:

1. Process for making pure detrition-resistant boron nitride pressed bodies from a boron-nitrogen-hydrogen compound having the general basic empirical formula $BN_{3-x} H_{6-3x}$, where the value of $x$ is greater than 1 and smaller than 2, which comprises heating said compound to a temperature of 700° to 1,200°C under a pressure of 0.5 – 10 t/cm².

2. Process according to claim 1, in which said boron-nitrogen-hydrogen compound is mixed with boron nitride powder before said heating under pressure is performed.

3. Process according to claim 1, in which 10 to 70 percent by weight of boron nitride powder is admixed with said boron-nitrogen-hydrogen compound.

* * * * *